United States Patent [19]
Greenberg et al.

[11] Patent Number: 6,091,721
[45] Date of Patent: Jul. 18, 2000

[54] APPARATUS FOR TELEPHONE COMMUNICATION OVER PLURAL CHANNELS

[76] Inventors: Leonard H. Greenberg, 1147 Elm Ave., #204, Glendale, Calif. 91201; Philip L. Young, 1127 Franklin St., Fremont, Ohio 43420

[21] Appl. No.: 08/807,726

[22] Filed: Feb. 28, 1997

Related U.S. Application Data

[60] Provisional application No. 60/012,381, Feb. 28, 1996.

[51] Int. Cl.[7] .................................................. H04L 12/64
[52] U.S. Cl. ........................ 370/352; 370/353; 379/93.07
[58] Field of Search ..................................... 370/219, 220, 370/227, 228, 238, 352–396; 379/93.07

[56] References Cited

U.S. PATENT DOCUMENTS

| | | | |
|---|---|---|---|
| 5,210,740 | 5/1993 | Anzai et al. ................................ | 370/16 |
| 5,608,786 | 3/1997 | Gordon ..................................... | 379/100 |
| 5,635,980 | 6/1997 | Lin et al. .................................... | 348/13 |
| 5,712,907 | 1/1998 | Wegner et al. .......................... | 379/112 |
| 5,751,706 | 5/1998 | Land et al. ............................... | 370/352 |
| 5,761,280 | 6/1998 | Noonen et al. ....................... | 379/93.27 |
| 5,838,665 | 11/1998 | Kahn et al. .............................. | 370/260 |

FOREIGN PATENT DOCUMENTS

98/30007  7/1998  WIPO .............................. H04M 7/00

*Primary Examiner*—Melvin Marcelo
*Attorney, Agent, or Firm*—MacMillan, Sobanski & Todd, LLC

[57] ABSTRACT

A method and apparatus for facilitating voice and data communication between audio communication devices while utilizing a communication path other than long distance telephone lines includes interface adapters which respond to predetermined identification codes to automatically establish the desired communication path.

11 Claims, 3 Drawing Sheets

APPARATUS FOR TELEPHONE COMMUNICATION OVER PLURAL CHANNELS

This application claims priority from Provisional Application 60/012,381, filed Feb. 28, 1996.

BACKGROUND OF THE INVENTION

The present invention relates generally to an apparatus and method for telephone communication and, in particular, to an apparatus for converting standard telephone systems to use with non-standard communication channels.

Currently, a number of software programs are available which utilize the Internet for making toll-free telephone calls. For such benefit currently to be realized, one must own or otherwise have access to a computer terminal, an Internet account, Internet access software, and be somewhat well-versed in computers, computer setup and Internet protocol and procedures.

The present invention utilizes a dedicated telephone for automatically accessing the Internet, handling sign-on protocol and connecting with other Internet telephone users. Such an implementation will make available on a widespread basis, use of such technology at a substantial cost-savings to the consumer. An adapter can be employed for use with conventional, cellular and other telephone systems for the same purpose. The primary benefit of this invention over the prior art is simplicity, approaching the simplicity of using a conventional telephone, thereby allowing the general public to enjoy low-cost or toll-free telephone communications.

An alternate embodiment provides for an interface between an existing telephone and the telephone wall connection. The interface contains DTMF (dual tone multifrequency) decoding, such that pressing a predetermined touch-tone sequence will initialize an Internet log-on procedure and provide for connection to the appropriate Internet location. Any touch-tone sequence other than this recognized sequence will pass-through the interface ignored, and be handled the same as a conventional telephone call. Such an interface is also be capable of receiving a call and recognizing incoming calls from other Internet telephones.

Other means available now or in the future can use media other than the Internet as a means of connecting people via communication equipment. As well, other types of communication can be employed to transfer information from one point to another, or to various destinations alone or simultaneously. Such media includes but is not limited to conventional telephone lines, ISDN, satellite, DBS, cable television, microwave or other RF means, fiber optic lines, etc. Other types of communication include but are not limited to audio, video, facsimile, text and binary data and program material intended to be broadcast to one, two or a multitude of receiving points.

SUMMARY OF THE INVENTION

The present invention concerns an apparatus and method for facilitating voice and other communications between standard communication fixtures such as telephones, while utilizing alternative mediums not necessarily intended for support of such services. For example, computer terminals are currently being experimented with in order to provide telephony communication to other computer terminals via interconnection with the Internet, cable television, RF or other mediums. Such techniques digitize an analog audio signal from a microphone and pass this digital information as data through a computer to a modem, whereby the digital data is converted into a modulated audio signal of suitable bandwidth and conditioning to allow reliable transmission via telephone lines. At the other end, a similar second party's modem is connected to the first modem through the telephone company central office and reverses the process, converting the audio data signals into computer data for processing by the second party's computer, and ultimately being converted to an analog signal resembling the originating communication which is then output to a loudspeaker. Such communication can operate in either half or full-duplex modes.

Various techniques have been employed to connect computers to conventional telephones, such as providing a dedicated server that accepts incoming Internet telephony, and through a standard telephone interconnection, acts as a relay between a computer user and a standard telephone user. Such intermediaries typically charge the originator of a call a fee somewhat less than a conventional telephone company would charge for the same call. Such arrangements are particularly useful in establishing international calls.

What has not yet been accomplished is a means of allowing two conventional telephone users to interconnect through an alternate medium such as the Internet, without requiring a computer, operating software, associated hardware and operating knowledge to exist at least at one end of the conversation.

As but one means of illustration, the present invention can utilize a dedicated telephone (conventional or cellular) for automatically accessing the Internet, transparently handling sign-on protocol and other necessary handshaking processes, ultimately providing a simplified means of connecting with other Internet telephone users. Such an implementation will make available on a wide-spread basis use of such technology at a substantial cost-savings to the consumer.

Alternatively, instead of a dedicated telephone, an interface adapter can be utilized with conventional telephone devices to achieve the same end result. When an Internet-originated phone call is received by the interface, a handshaking protocol is enacted. Such an initializing handshaking sequence can, among other ways, proceed as follows:

Party One initiates a phone call to Party Two by first keying into his telephone a DTMF sequence designed to log onto the Internet, followed by Party Two's predesignated identification number sequence. Party One's interface logs onto the Internet and notifies Party Two's server account that a call is being initiated. Party Two's local server dials Party Two's phone number. When Party Two's telephone or telephone interface device answers the incoming call from the local server, the interface adapter circuit recognizes the modem carrier and via data communication establishes that this call has originated from Party One's Internet telephone. Party Two's interface then handles any necessary log-on transaction with the local server and connects with Party One's Internet telephone, and sends a ring voltage sequence to the telephone. Such ring voltage can be made to have a distinctive ring pattern so that Party Two knows that the call originated via the Internet. Furthermore, firmware can be built into the interface and appropriate software written to allow for identifying the caller to Party Two prior to commencing voice or data communications.

The equipment utilized by the two parties comprising a typical telephone call will be hereinafter referred to as Box 1, Box 2, etc. Although such units may ultimately be add-on boxes, they may also be built into a telephone.

In this embodiment of the invention, the unit must be easy to install and operate for persons lacking computer literacy. Logon sequences may differ from Internet-server to Internet-server and various automatic log on sequences can be incorporated into non-volatile memory to account for this.

A necessary step for the conventional telephone user who does not already have an Internet-provider account is setting up a new account and billing. During account set-up, it will be assumed here that either a credit card or checking account number will be entered via a telephone DTMF touch tone pad. The process can be made very straightforward via an ASCII to voice converter in the Box that talks the new user through a set-up procedure, or alternately, an RF converter or video output to a TV for visual prompting can be utilized. Another approach is for the user to dial a dedicated service for assistance with initial set-up. The new user calls this service, and after answering a few questions from either a human or automated voice system, the service programs the Box with the required set-up data utilizing DTMF or other data.

Additional known-caller phone numbers can be programmed into the Box, along with information such as whether the user has caller ID, call waiting, etc.

An example of one possible detailed sequence of events follows. This sequence is for Caller 1 and adapter Box 1 calling Caller 2 and adapter Box 2 through the Internet. Both callers in this case have Caller ID service, and the ability to disable call waiting. Caller 1 dials the phone number of Caller 2. This number is detected by Box 1 as being a number that Caller 1 wishes to call using the Internet. Box 1 emits a tone to the handset acknowledging the detection of the desired Internet call, and Caller 1 hangs up. A pleasant beep . . . beep is emitted from a speaker in Box 1 to let Caller 1 know that it is in the process of connecting.

Box 1 now dials the number of Caller 2. Box 2 mutes the first ring so that Caller 2 does not answer the phone thereby incurring a long distance connection fee. Box 2 then detects the caller ID of Caller 1 and searches its list of phone numbers to determine that it is an Internet-connectable phone number. Box 2 hangs up, as does Box 1, while Box 2 now emits the beep . . . beep tone letting Caller 2 know it is in the process of connecting. Both boxes then connect with the Internet through their local servers, the software in the boxes enter the "chat" mode, handshake with each other over the Internet to let both boxes know they are connected, and then the boxes produce a ring signal to cause the phones of Caller 1 and 2 to ring. Caller 1 and 2 answer their phones and now talk normally as if connected directly via conventional telephone lines.

If a Caller 2 does not have Caller ID available, then Caller 2's phone will ring, and when answered a modem tone will be heard, communicating to Box 2 that an Internet call is incoming and specifying what phone number it is from, and Box 2 transmits acknowledge data to Box 1. The two boxes then disconnect as soon as acknowledgment of this information has been achieved. Both Boxes are now emitting their beeping sequence to inform Caller 1 and 2 of call progress, and connect with the Internet as above, ringing the callers' phones when connection via the Internet is complete. The above use would incur a minimum one minute long distance connection fee from Caller 1's local telephone company. The Boxes are designed so that they operate initially as in the latter example if the caller ID method is in use and a non-recognized "Internet" number is received. After receiving the modem tone from an unlisted Internet caller, the Box will automatically program that number into its list of Internet phone users. The memory in the boxes for storing those numbers can be a thousand numbers long or greater, and will bump the last used number if it eventually runs out of number storage.

If either party wishes to speak over normal long distance lines, a DTMF or other switched sequence such as *67 is entered prior to dialing the call, which turns off the caller box, allowing transparent use of the phone system.

A more simplistic embodiment still utilizing the concept of the telephone Interface Adapter is to standardize Internet server protocol, whereby the Internet server network acts as the intermediary relaying connection preambles as well as relaying the actual information to be communicated.

The primary benefits of the present invention are to afford a convenience and simplicity approaching that of conventional telephones or other communication equipment, as well as allowing the general public to enjoy low-cost or toll-free communications without the need for computer and/or electronic prowess. Additional benefits, as they become evident, will be realized by the continuous emergence of new methods of communication media and devices.

It is therefore an object of the present invention to provide a simplified means of interconnecting standard communication fixtures (telephone, television, etc.) to other standard communication fixtures while utilizing non-standard communication channels (the Internet, cable TV, RF, fiber optics, etc.).

A second object of the invention is to provide a simplified means of interconnecting non-standard communication fixtures (computers, etc.) to standard communication fixtures and vice-versa through non-standard communication channels without the necessity of third-party intervention.

A third object of the invention is to provide a simplified means of interconnecting non-standard communication fixtures to standard communication fixtures and vice-versa through standard communication channels (telephone lines, etc.) without requiring third-party intervention.

A fourth object of the invention is to provide a simplified means of interconnecting non-standard communication fixtures to other non-standard communication fixtures and vice-versa through non-standard communication channels.

A fifth object of the invention is to provide a simplified means of interconnecting standard or non-standard communication fixtures to other standard communication fixtures through non-standard communication mediums by providing a protocol by which the medium itself initiates and coordinates the connection preambles necessary to establish and mediate the communications.

A sixth object of the invention is to provide the general public with an economical means of originating communication interconnections between two or more locations by automating necessary protocol and handshaking.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
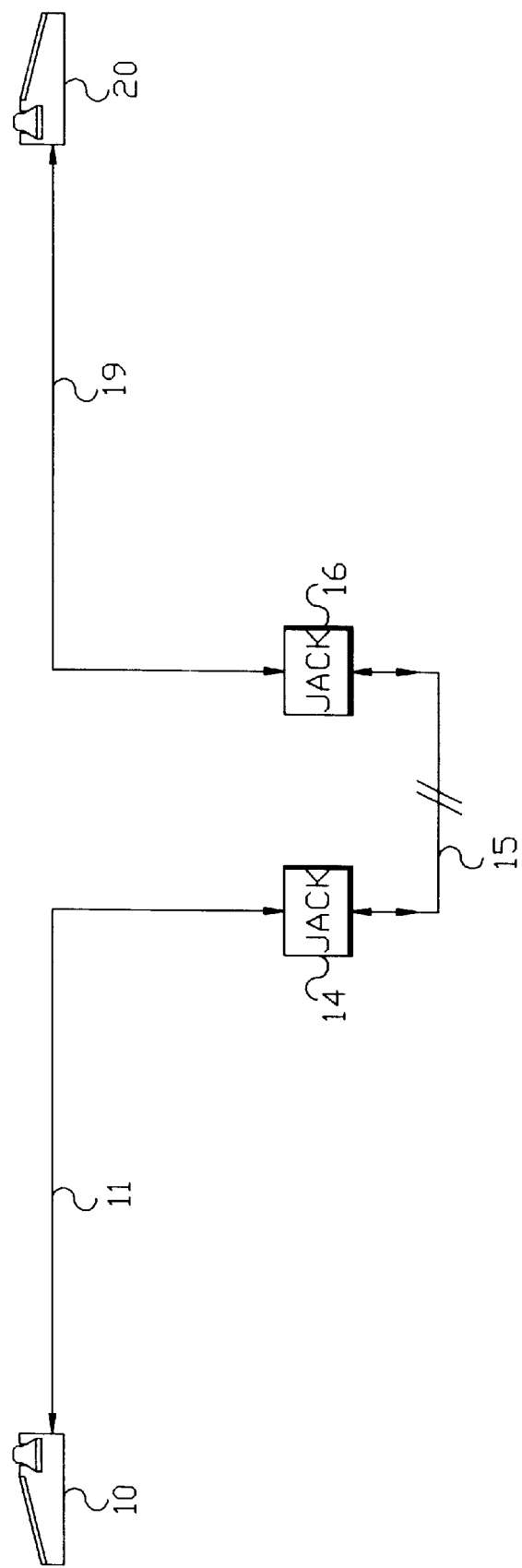
FIG. 1 is a simplified schematic block diagram of the typical interconnection of two telephones via normal telephone service equipment.

The drawing FIG. 1 depicts a simplified block diagram of the typical interconnection of two telephones via normal telephone service equipment.

Referring to the FIG. 1, a first telephone 10 is connected via an interconnect cable 11 to a telephone jack 14. The telephone jack is typically wall mounted and of an industry standard type. The telephone jack 14 is connected to a service provider and necessary routing equipment via a path 15. A second telephone 20 is connected via an interconnect cable 19 to its respective telephone jack 16 which is connected to a service provider and necessary routing equipment, again via the path indicated by 15.

In operation, the placing of a call at the first telephone 10 by entering a proper sequence of DTMF tones causes the service provider's routing equipment to connect the first telephone 10 to the second telephone 20. An AC voltage is delivered via the interconnection path to the second telephone 20 which causes its ringer to ring. The lifting of the handset of the second telephone 20 causes a switch to impress an off hook condition onto the telephone interconnection path which in turn signals the routing equipment in the path 15 to complete the interconnection of the two telephones 10 and 20. Users of the two stated phones can now converse.

Figure 2:
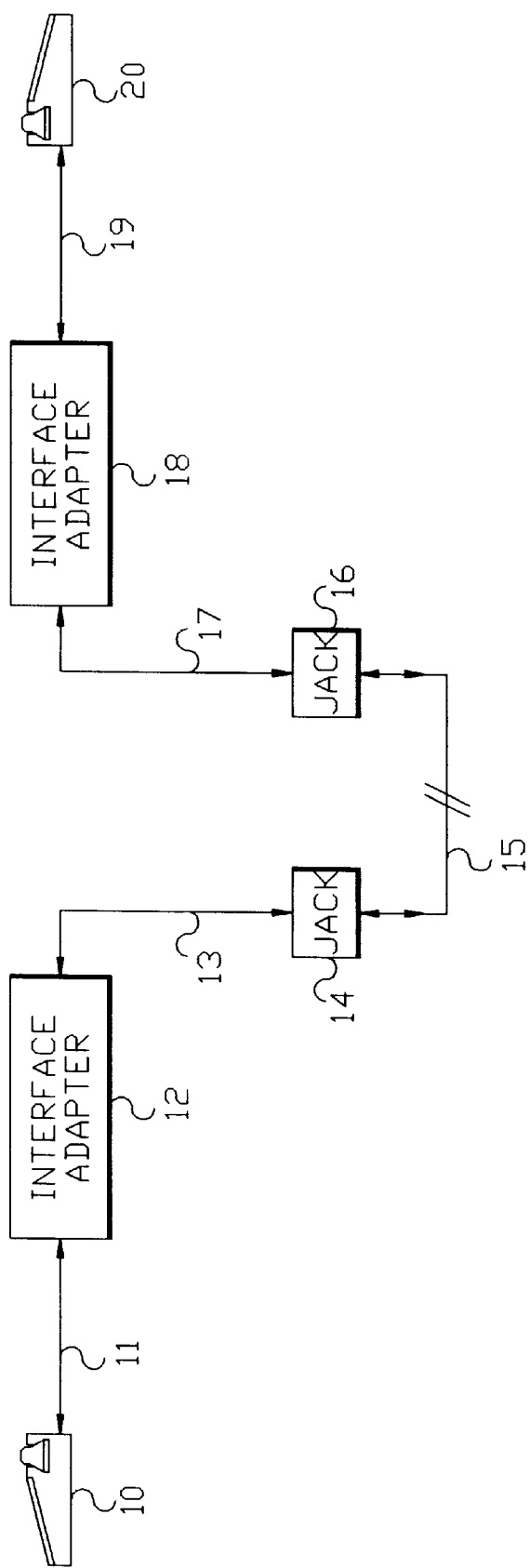
FIG. 2 is a schematic block diagram of the typical interconnection of two telephones via normal telephone service equipment including the insertion of one possible embodiment of an Interface Adapter described in the present invention.

The drawing FIG. 2 depicts the connection and utilization of one embodiment of this invention with the equipment depicted in the drawing FIG. 1.

Referring to the FIG. 2, the first telephone 10 is connected via its interconnect cable 11 to a telephone jack mounted on a first INTERFACE ADAPTER 12. A second telephone jack mounted on the first INTERFACE ADAPTER 12 is connected via an interconnect cable 13 to the telephone jack 14. The telephone jack 14 is connected to a service provider and necessary routing equipment via the path 15. Similarly, the second telephone 20 is connected via its interconnect cable 19 to a telephone jack mounted on a second INTERFACE ADAPTER 18. A second telephone jack mounted on the second INTERFACE ADAPTER 18 is connected via an interconnect cable 17 to the telephone jack 16. In this manner, the two INTERFACE ADAPTERS 12 and 18 are simply connected between the two respective telephones and their respective telephone jacks.

Figure 3:
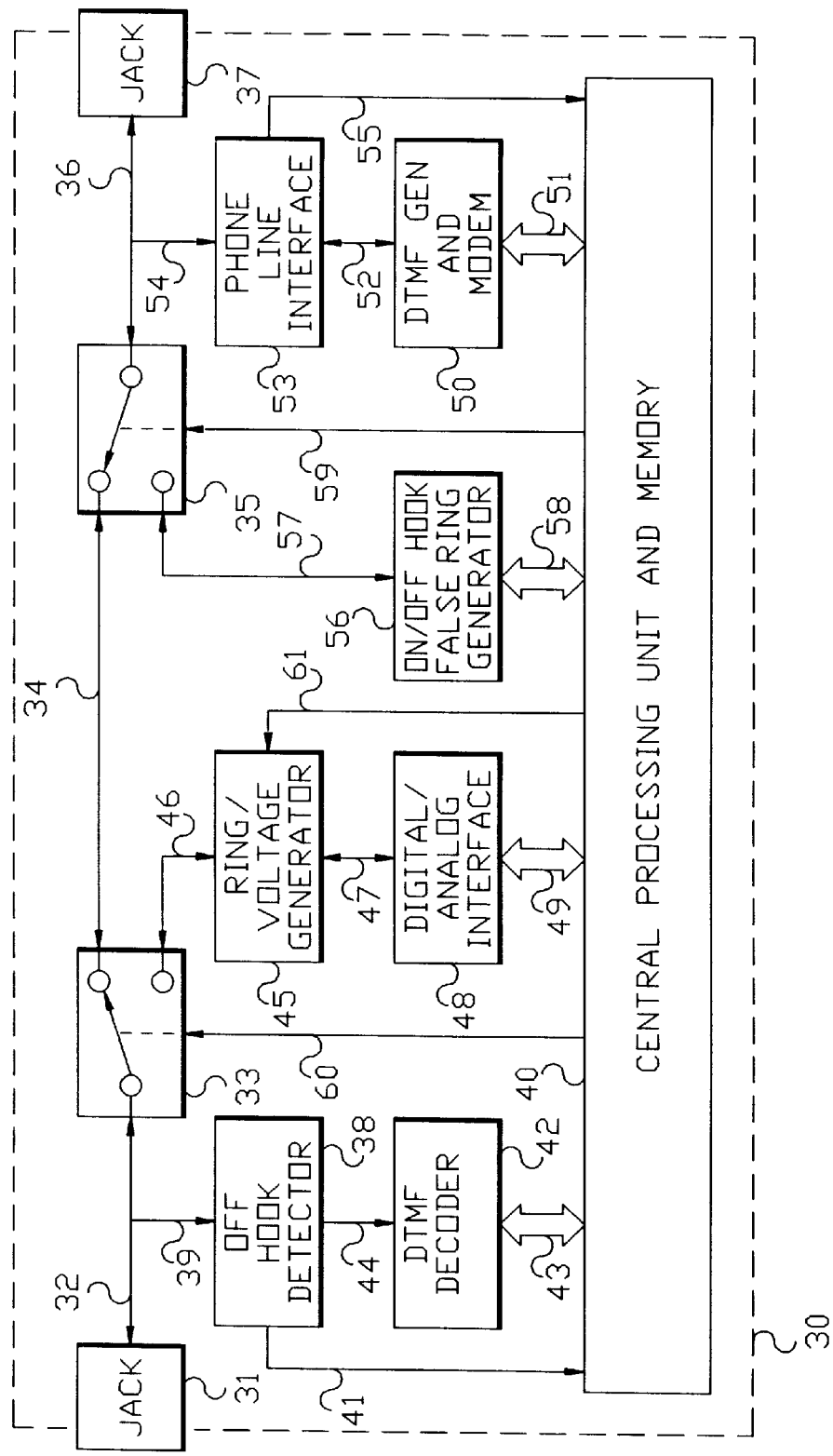
FIG. 3 is a schematic block diagram detail of the Interface Adapter shown in the FIG. 2.

The drawing FIG. 3 depicts a block diagram of one embodiment of the INTERFACE ADAPTER 12 and the INTERFACE ADAPTER 18 shown in the drawing FIG. 2.

Referring to the drawing FIG. 3, a first telephone jack 31 mounted on an INTERFACE ADAPTER 30 is used for connecting a telephone such as the telephone 10 of the FIG. 2 to the INTERFACE ADAPTER 30. The telephone jack 31 is connected via a signal line 32 to a center or common terminal of a first two pole electrically controlled switch 33. The electronic switch 33, in its normal state, passes the signals on a line 34 to a second two pole electrically controlled switch 35. The second electrically controlled switch 35 normally passes the signals on the lines 32 and 34 to a second telephone jack 37 mounted on the INTERFACE ADAPTER 30 via a signal line 36.

In the above manner, a telephone connected to the first telephone jack 31 will operate normally when the second telephone jack 37 is connected to a standard, typically wall mounted, telephone jack to which the telephone would, without the use of the INTERFACE ADAPTER 30, be connected. This allows for transparent and normal use of the telephone when placing or receiving normal calls.

In order to place a call over an alternate medium, such as the Internet, the INTERFACE ADAPTER 30 must first be programmed by the user. This programming operation stores data in the INTERFACE ADAPTER 30 that reflects the desired service provider, phone numbers that are to use the Internet, logon sequence, passwords and other data necessary to perform its functions. Various methods can be utilized to perform these processes, and the methods used will be as transparent to the user as possible in order to preserve the concept of simplicity, which is a main advantage of the present invention.

One method of connection is for the user to lift the handset of the telephone 10 in the FIG. 2 connected to the INTERFACE ADAPTER 12 (30) from its cradle, thus establishing an off-hook condition. This is detected by an OFF HOOK DETECTOR 38 of the FIG. 3 connected to the telephone via the jack 31, the signal line 32, and a line 39. An off-hook indicating signal is generated by the DETECTOR 38 to a CENTRAL PROCESSING UNIT AND MEMORY 40 via a signal line 41. The signal present on the line 41 alerts the CPU & MEMORY 40 to the off-hook condition, causing the CPU to wait for DTMF sequences from the telephone via a DTMF DECODER 42 connected to the CPU via a data bus 43. The DTMF DECODER 42 is connected to the telephone via a signal line 44 connected to a feed through output from the OFF HOOK DETECTOR 38. To program the INTERFACE ADAPTER 30, the user can now enter a specific touch tone (DTMF) sequence (such as *PGM) via the telephone's keypad to commence the programming sequence. Upon receipt of this sequence, the CPU & MEMORY block 40 switches the state of the electrically controlled switch 33 via a control line 60 connected to the CPU & MEMORY 40 so that the telephone is connected to a RING/VOLTAGE GENERATOR 45 via a signal line 46. The purpose of the RING/VOLTAGE GENERATOR 45 is to provide the necessary DC voltage to operate the telephone and to provide, when instructed by the CPU via a signal path 61, an AC voltage capable of causing the connected telephone to ring. The telephone connection from electrically controlled switch 33 via the signal line 46 is connected via a feed through the RING/VOLTAGE GENERATOR 45 and a path 47 to a DIGITAL/ANALOG INTERFACE 48 which translates digital signals to their analog equivalent, and vice versa. The DIGITAL/ANALOG INTERFACE 48 converts digital data from the CPU & MEMORY 40 via a data bus 49 to analog signals that can be heard at the connected telephone's receiver. The DIGITAL/ANALOG INTERFACE 48 also converts analog signals from the telephone into digital signals that are fed to the CPU & MEMORY 40, again via the data bus 49. Once the programming mode has been entered, CPU-generated voice prompts from data stored in non-volatile memory instruct the user to enter their service provider's telephone number, user name, password, credit card information, etc.

An alternate programming approach is for the user to dial a phone number whereby the user can speak with a human operator who asks the user for the required information. The human operator then programs the INTERFACE ADAPTER 30 by sending digital data to the INTERFACE ADAPTER. This data is detected at the INTERFACE ADAPTER 30 via a DTMF GEN AND MODEM 50. The DTMF GEN AND MODEM 50 is connected to the CPU & MEMORY 40 via a data bus 51. The DTMF GEN AND MODEM 50 is connected to the telephone line via a signal line 52 and a feed through from a PHONE LINE INTERFACE 53 connected to the telephone line via a line 54 and the signal line 36. The PHONE LINE INTERFACE 53 provides impedance matching and signal duplexing for proper operation of the DTMF GEN AND MODEM 50 and also feeds a ring detect signal to the CPU & MEMORY 40 via a signal line 55. Upon completion of the programming sequence, the user telephone, and that of the programming operator, are hung-up and the INTERFACE ADAPTER 30 returns to its normal state.

After the INTERFACE ADAPTER 30 is programmed, telephone calls can be placed via the Internet, or other medium, by lifting the connected telephone off its cradle and dialing a specific key pad sequence, such as *NET. This sequence is detected by the INTERFACE ADAPTER 30 in a manner similar to the programming DTMF sequence detection described above, and the INTERFACE ADAPTER 30 then enters its 'Internet call mode'. After the user enters the *NET sequence, the user continues to enter the area code and telephone number of the person with whom they wish to speak to via an Internet connection. The placed call proceeds as normal over standard voice connection paths. Simultaneously a carrier tone is sent from the INTERFACE ADAPTER 12 (30) of the FIG. 2 to the receiving INTERFACE ADAPTER 18 (30) of the FIG. 2 (the carrier's amplitude is greatly reduced in the caller's handset to be less annoying and will be explained later in this document). Assuming it has been programmed, the receiving caller's INTERFACE ADAPTER 18, detects the incoming caller ID signal and recognizes it as an Internet call. The receiving INTERFACE ADAPTER 18 inhibits the ringer in the receiving telephone by activating the electrically controlled switch 35 in the receiving INTERFACE ADAPTER 18 via a control line 59 of the FIG. 3 connected to the CPU & MEMORY 40. The call initiating INTERFACE ADAPTER 12 allows the connection to exist for a predetermined length of time (approximately 5 seconds) and then instructs the caller, via computer generated voice prompts (or optional INTERFACE ADAPTER-mounted indicators or video interface to a television, etc.), to hang up the phone and standby. At this time both the calling 12 and receiving 18 INTERFACE ADAPTERS electronically place calls to their respective Internet servers and log onto the Internet. This is accomplished by activating the electrically controlled switch 35 which connects the phone line at 36 to an ON/OFF HOOK FALSE RING GENERATOR 56 via a line 57. The ON/OFF HOOK FALSE RING GENERATOR 56 presents either an off-hook or on-hook impedance to the phone line as commanded by the CPU & MEMORY 40 via a data bus 58. The ON/OFF HOOK FALSE RING GENERATOR 56, under CPU command, can also generate a false ringing tone that is sent to the telephone line via the line 57, the switch 35, the signal line 36, and the jack 37. Once an off-hook condition is established, the CPU instructs the DTMF GEN AND MODEM 50 to generate the necessary DTMF tones to disable call waiting if necessary and to dial, as preprogrammed, into the Internet server. When the server answers, the CPU switches the DTMF GEN AND MODEM 50 to the modem mode and sends the required carrier and handshake signals to establish a connection. Software stored within memory in the CPU & MEMORY 40 then proceeds to log onto the Internet and establish a digital audio connection with the opposing INTERFACE ADAPTER's Internet address.

While this connection is being established, the telephones of both the calling and receiving party produce brief ring sequences (different from and less annoying than a normal ring) via the RING/VOLTAGE GENERATOR 45 and a line 61, the signal line 46, the switch 33, the signal line 32, the jack 31, and CPU control. Upon completion of the Internet audio connection by both INTERFACE ADAPTERs, a more normal ring is generated which alerts the users that the phone connection has been established. Both parties lift their respective receivers from their cradles and proceed to communicate as though they were on a normal telephone connection.

Upon completion of the telephone conversation, both parties hang up and the INTERFACE ADAPTERs log off the Internet and return to their normal 'transparent mode'.

If the receiving party is not home, after the receiving party's INTERFACE ADAPTER rings for a predetermined amount of time without being answered, the calling party can be voice prompted via ancillary circuitry within the INTERFACE ADAPTER to the effect that the receiving party is not available. Voice E-Mail can then be left by the calling party. After receiving voice E-Mail, the receiving caller's INTERFACE ADAPTER will then generate very short ring bursts periodically in the receiving caller's telephone via the GENERATOR 45, the signal line 46, the switch 33, the signal line 32, the jack 31, and the CPU via the line 61 and the line 60 to alert the receiving party that they have E-Mail waiting for them on the Internet. The receiving party can retrieve that voice E-mail by lifting the telephone receiver and entering a sequence such as *MAIL. Alternatively, a receiving INTERFACE ADAPTER can be modified by providing additional memory capacity and standard circuitry to allow the message to be left within random access memory within the INTERFACE ADAPTER itself, or a message can be opted to be left on a conventional automatic telephone answering device at the receiving location.

When a call is received by an INTERFACE ADAPTER from a caller that does not have caller ID, the INTERFACE ADAPTER will answer the phone immediately. If a carrier signal from a calling INTERFACE ADAPTER is detected, an acknowledge signal is sent to the calling INTERFACE ADAPTER and both INTERFACE ADAPTERs hang up. The brief ring sequences and log on process then continue as described above and an Internet telephone call is established.

If a call is received by an INTERFACE ADAPTER from a caller that does not have caller ID, the INTERFACE ADAPTER will answer the phone immediately. If a carrier signal from a calling INTERFACE ADAPTER is not detected, the CPU will cause the receiving telephone to ring via the RING/VOLTAGE GENERATOR 45, the signal line 46, the switch 33, the signal line 32, the jack 31, and CPU control via the line 61. This alerts the user at the receiving end to the incoming normal voice call and the receiving party answers as normal. If they do not answer in a predetermined amount of time, the receiving INTERFACE ADAPTER hangs up by establishing an off-hook condition.

Additional control features via a DTMF sequence entered by a user such as *GONE allow the user to prevent the INTERFACE ADAPTER from answering an incoming call when the user is not going to be home. A different DTMF sequence such as *HERE allows the unit to return to normal operation.

Additional features can include a display and control panel contained in and on the INTERFACE ADAPTER for user prompting, status indication, data entry, mode selection, etc. A video interface to the CPU can allow display of user prompts, status and modes on a television or LCD screen. An internal tone-emitting device under CPU control can also be used to provide status and user prompts.

Although the INTERFACE ADAPTERs depicted above are shown as being connected between a single telephone and its respective wall mount telephone jack, an INTERFACE ADAPTER can alternately be connected at the telephone line entry location prior to splitting off the line to multiple telephone installations. This would allow any telephone at a given location to be used to place an Internet-established telephone call. Additionally, although the above description depicts the connection of this invention in a typical residential telephone installation, INTERFACE ADAPTERs can be incorporated into larger commercial installations utilizing PBX systems, etc. The circuitry concept and variations thereof may alternately be installed within the physical telephone device itself, furthering the transparency advantage of the invention.

The apparatus for voice and data communication over a communication path, according to the present invention, includes: the pair of audio communication means 10,20 for connection to the communication path 15 to enable voice and data communication between the audio communication means, the audio communication means each having user actuated identification code entry means; the first interface adapter means 12,30 connected to the first one 10 of the audio communication means and having a memory for storing an identification code associated with the second one 20 of the audio communication means; and the second interface adapter means 18,30 connected to the second audio communication means 20 and having a memory for storing an identification code associated with the first audio communication means 10, whereby when the first and second interface adapter means 12,18,30 are connected to the first communication path 15 and a first user enters the second audio communication means identification code into the first audio communication means identification code entry means, the first interface adapter means responds to the second identification code by interconnecting with the second interface adapter means through the first communication path, the first and second interface adapters respond to the interconnection by disconnecting from the first communication path and automatically connecting to a second communication path whereby voice and data communication is enabled between the first and second audio communication means.

The method for telephone communication, according to the present invention, comprises the steps of: a. connecting a first interface adapter between a first telephone and a first communication path providing standard telephone communication and connecting a second interface adapter between a second telephone and the first communication path; b. storing a first identification code associated with the first telephone in the second interface adapter and storing a second identification code associated with the second telephone in the first interface adapter; c. dialing the second identification code on the first telephone; d. comparing the dialed second identification code with the stored second identification code in the first interface adapter and generating an audible acknowledgement signal from the first interface adapter through the first telephone in response to a match between the dialed second identification code and the stored second identification code; e. hanging up the first telephone in response to the audible acknowledgement signal; f. dialing a phone number associated with the second telephone and generating the first identification code over the first communication path from the first interface adapter; g. muting ringing of the second telephone and comparing the generated first identification code with the stored first identification code in the second interface adapter and discontinuing communication between the first interface adapter and the second interface adapter in response to a match between the generated first identification code and the stored first identification code; h. connecting the first interface adapter and the second interface adapter through a second communication path; and i. ringing the first telephone and the second telephone to signal users that voice communication is available through the first and second telephones and the second conmnunication path.

The above demcriptions of the drawings and the operation of the systems depicted therein are intended to describe only several possible embodiments of this invention and are not to be construed as limitations thereof.

These are but examples of ways in which the present invention affords the general public the ability to communicate at a greatly reduced expense. Improvements to this basic concept will endow the public with yet more convenience and flexibility without having to be bothered with "computer mania."

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for voice and data communication over a communication path comprising:

a pair of audio communication means for connection to a communication path to enable voice and data communication between said audio communication means, said audio communication means each having user actuated identification code entry means;

a first interface adapter means connected to a first one of said audio communication means and having a memory for storing an identification code associated with a second one of said audio communication means; and a second interface adapter means connected to said second audio communication means and having a memory for storing an identification code associated with said first audio communication means, whereby when said first and second interface adapter means are connected to a first communication path and a first user enters said second audio communication means identification code into said first audio communication means identification code entry means, said first interface adapter means responds to said second identification code by interconnecting with said second interface adapter means through the first communication path, said first and second interface adapters respond to said interconnection by disconnecting from said first communication path and automatically connecting to a second communication path whereby voice and data communication is enabled between said first and second audio communication means.

2. The apparatus according to claim 1 wherein said first and second audio communication means are each one of a telephone, a television and a computer.

3. The apparatus according to claim 1 wherein said first communication path is a telephone system and said second communication path is one of the Internet, a cable television system, a radio frequency transmission system and a fiber optic communication system.

4. The apparatus according to claim 1 wherein said first and second audio communication means are telephones and each of said first and second interface adapters includes an off hook detector and a DTMF decoder connected to a first telephone jack for connection to an associated one of said telephones.

5. The apparatus according to claim 4 wherein each of said first and second interface adapters includes a ring/voltage generator and a digital/analog interface connected to said first telephone jack by a switch means.

6. The apparatus according to claim 4 wherein each of said first and second interface adapters includes a phone line interface and a DTMF generator and modem connected to a second telephone jack for connection to said first and second communication paths.

7. The apparatus according to claim 6 wherein each of said first and second interface adapters includes an on/off hook false ring generator connected to said second telephone jack by a switch means.

8. An interface adapter apparatus for telephone communication comprising:

a first telephone jack for connection to a telephone;

a second telephone jack for connection to a communication path;

a switch means having a first mode connecting said first telephone jack to said second telephone jack for transmitting telephone calls between a telephone connected to said first telephone jack and a communication path connected to said second telephone jack, and being responsive to a selection signal for switching to a second mode disconnecting said first telephone jack from said second telephone jack; and a control means being connected to said first jack, to said second jack and to said switch means whereby when a telephone is connected to said first jack, said control means responds to a predetermined keypad sequence of signals generated by a user dialing the telephone by generating a first predetermined carrier signal corresponding to a telephone number subsequently dialed on the telephone by the user, generating said selection signal and generating a second predetermined carrier signal at said second telephone jack for accessing an alternate communication path.

9. A method for telephone communication comprising the steps of:

a. connecting a first interface adapter between a first telephone and a first communication path providing standard telephone communication and connecting a second interface adapter between a second telephone and the first communication path;

b. storing a first identification code associated with the first telephone in the second interface adapter and storing a second identification code associated with the second telephone in the first interface adapter;

c. dialing the second identification code on the first telephone;

d. comparing the dialed second identification code with the stored second identification code in the first interface adapter and generating an audible acknowledgement signal from the first interface adapter through the first telephone in response to a match between the dialed second identification code and the stored second identification code;

e. hanging up the first telephone in response to the audible acknowledgement signal;

f. dialing a phone number associated with the second telephone and generating the first identification code over the first communication path from the first interface adapter;

g. muting ringing of the second telephone and comparing the generated first identification code with the stored first identification code in the second interface adapter and discontinuing communication between the first interface adapter and the second interface adapter in response to a match between the generated first identification code and the stored first identification code;

h. connecting the first interface adapter and the second interface adapter through a second communication path; and i. ringing the first telephone and the second telephone to signal users that voice communication is available through the first and second telephones and the second communication path.

10. The method according to claim 9 wherein said step d. includes generating the audible acknowledgement signal upon expiration of a predetermined time and before performing the step f.

11. The method according to claim 9 wherein said step g. is performed by generating from the first interface adapter a carrier signal at an amplitude reduced from an amplitude of a standard telephone carrier signal.

* * * * *